(12) United States Patent
Eriksson et al.

(10) Patent No.: US 9,166,743 B2
(45) Date of Patent: Oct. 20, 2015

(54) METHOD FOR HANDLING TRANSMISSION ERRORS ON A TELECOMMUNICATIONS TRANSMISSION LINE

(75) Inventors: Per-Erik Eriksson, Stockholm (SE); Chenguang Lu, Sollentuna (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 161 days.

(21) Appl. No.: 13/976,665

(22) PCT Filed: Dec. 29, 2010

(86) PCT No.: PCT/EP2010/070880
§ 371 (c)(1),
(2), (4) Date: Jun. 27, 2013

(87) PCT Pub. No.: WO2012/089254
PCT Pub. Date: Jul. 5, 2012

(65) Prior Publication Data
US 2013/0272110 A1    Oct. 17, 2013

(51) Int. Cl.
*H04L 1/08*     (2006.01)
*H04L 1/18*     (2006.01)
*H04L 1/20*     (2006.01)

(52) U.S. Cl.
CPC ............ *H04L 1/08* (2013.01); *H04L 1/1867* (2013.01); *H04L 1/20* (2013.01); *H04L 1/1874* (2013.01)

(58) Field of Classification Search
CPC ... H04L 1/1874; H04L 1/0071; H04L 1/1835; H04L 1/1809; H04L 1/08; H04L 45/00
USPC .................. 370/216, 252, 222, 227, 235, 244
See application file for complete search history.

(56) References Cited

U.S. PATENT DOCUMENTS

2009/0177938 A1*    7/2009    Pons et al. .................... 714/751

FOREIGN PATENT DOCUMENTS

| EP | 1816776 A1 | 8/2007 |
|---|---|---|
| WO | 2010004230 A2 | 1/2010 |

\* cited by examiner

*Primary Examiner* — Jamal Javaid
(74) *Attorney, Agent, or Firm* — Coats & Bennett, PLLC

(57) ABSTRACT

When data retransmission is used to handle errors caused by impulse noise, buffer memory requirements may be reduced and/or data rate increased by detecting impulse noise at the transmitting equipment and initiating retransmission in response to such detection rather than waiting for a retransmission indication from the receiving end. The decision to retransmit may be made dependent on the strength or other properties of the detected noise burst. The decision criterion may be made adaptive by correlating noise burst properties with received retransmission indications or the absence thereof.

16 Claims, 9 Drawing Sheets

METHOD FOR HANDLING TRANSMISSION ERRORS ON A TELECOMMUNICATIONS TRANSMISSION LINE

TECHNICAL FIELD OF THE INVENTION

The present invention relates to the field of data communication.

BACKGROUND

High speed data connections over telecommunications transmission lines such as existing telephone lines is an important technology. In particular, various kinds of DSL, such as e.g ADSL and VDSL2 are in, or are expected to come into widespread use to supply high speed data to customer premises such as homes and businesses.

DSL communications are sensitive to noise interference. In particular, impulse noise can be a problem. Impulse noise occurs as a burst or repeated bursts of very strong noise, and it can severely disrupt the reliability of the DSL connection. Impulse noise may be produced by various household electrical equipment present at customer premises (either when faulty or as a part of normal operation).

Trellis coding is a way to protect the data stream against noise interference. It works well for background noise, but is not efficient against impulse noise.

Reed-Solomon codes with interleaving is another noise protection scheme, which may be used against impulse noise. However, since impulse noise bursts are strong but relatively rare events, it is not very efficient in terms of use of memory and bandwidth. Coding and interleave must be configured for worst case noise impulses, and so most of the time, the bandwidth and memory resources allocated for noise protection aren't really needed.

A recent development of the VDSL2 standard is the inclusion of physical layer retransmission, which is described in "Draft Recommendation ITU-T G.998.4 Improved Impulse Noise Protection (INP) for DSL Transceivers". Such retransmission is particularly useful for protection against impulse noise, as it uses bandwidth only when the transmission of a data unit was actually affected.

Several methods for impulse noise protection are described in the publication "Impulse Noise Protection Initiatives in VDSL2 Systems" by Rahul Garg, Sunita Meena, Hemant Samdani and Patrick Duvaut of Conexant Systems Inc.; in U.S. Pat. No. 7,443,916 B2 (Sedarat et. al) as well as "Impulse noise protection for multicarrier communication systems", Hossein Sedarat, Benjamin Miller, and Kevin Fisher, 2005 IEEE International Conference on Acoustics, Speech, and Signal Processing As with any electronics equipment and methods for use therein, there is always a desire for improvements such as reduced memory usage and increased performance. A problem is thus to find improved ways of impulse noise protection.

SUMMARY

An improved way of impulse noise protection can be achieved by an adapted retransmission scheme.

A retransmission scheme uses buffer memory (retransmission queue, retransmission buffer) at the transmitting equipment to hold data units which have been sent so that a data unit may be retransmitted if the receiving equipment requires it, typically because the first transmission was corrupted by noise.

Likewise, the receiving equipment is typically required to deliver an ordered stream of received data units to other equipment to which it is connected, and thus when the reception of a data unit is corrupted, data units received later must be buffered in a receive buffer until a non-corrupt copy of the data unit is received and can be delivered (or until a maximum acceptable delay has been reached, in which case the corrupted data unit is not delivered, or delivered as corrupted). Delivery of the later data units then takes place.

From this follows that the retransmission queue needs to be large enough to at least accommodate all the sent data units for the time it takes from the moment a data unit is put in the transmit buffer until an indication of the data unit's reception status at the other end of the line is received and can be acted upon by the transmitter, e.g. by retransmitting the data unit if it was not received correctly or discarding the buffered data if reception was successful. This time will hereafter be denoted Round trip time (RTT).

Similarly, at the receiving side, the receive buffer needs to be at least large enough to be able to accommodate all the data units received from the moment that it is detected that a data unit is incorrectly received until a retransmitted copy is received and can be delivered to the connected equipment. This time will typically be equal or very similar to the RTT.

If it is required to protect against the case where the reception of a retransmitted data unit is also corrupted, so that the same data unit may need to be retransmitted more than once, more buffer space may be needed (depending on how the buffer is used), so that the data unit may be saved for approximately a time of n×RTT, where n is the number of possible retransmissions of the same data unit.

From the above, it follows that in a retransmission scheme, the buffer size at the sending and receiving side respectively must be at least the RTT times the data rate of the line, in order to allow a data unit to be retransmitted at least once. This means that for high data rates, buffers need to be large.

In the prior art, retransmission is always (and for obvious reasons) controlled by the receiving equipment. It is the receiving equipment that can detect that the reception of a data unit was corrupted, and indicate to the transmitting side that a retransmission is needed.

Now, when an electrical event generates strong impulse noise which enters a transmission line, the noise travels along the line in both directions. At each end of the line, a respective impulse noise burst originating from the event will appear.

Thus, when a burst of impulse noise occurs at one end of the line (for example at the customer premises), a corresponding burst of impulse noise originating from the same electrical event is usually detectable at the other end of the line. This is particularly true for short lines, which do not attenuate signals so much. Further, the travel time on the line for a signal or a noise impulse is very small (i.e. RTT consists mostly of processing time at the transmitting and receiving equipment), so detection will take place at virtually the same time.

By detecting impulse noise at the transmitting end instead of (or in addition to) detecting actual data corruption at the receiving end, and initiating retransmission in response to such detection, retransmission may be initiated earlier than with prior art methods which wait for an indication from the receiving end. The time from transmitting the data unit the first time until it is retransmitted can thereby roughly be at least cut in half.

Since the necessary buffer sizes depend on the time from sending a data unit the first time until retransmission of the data unit is initiated, this early initiation of retransmission reduces the need for buffer memory space, or alternatively, allows higher data rates for a given buffer size.

This provides a particularly good match for lines with low attenuation, such as short lines. For lines with low attenuation, when a noise burst causes data corruption at one end of the line it will almost always correspond to a detectable burst at the other end. And because of the low attenuation, short lines often run at high speeds where buffer memory size can be a problem.

Although not yet recognized in the art, some existing designs for VDSL2 actually have so limited memory space available for the retransmission buffer that for short lines where high data rates will be possible, the attainable data rate will be limited by the buffer size rather than by the line characteristics. In other words, it will not be possible to reach the potential of the line because of limitations in the DSL equipment. The present invention provides a way to alleviate or remove that limitation.

It may not be possible to tell with certainty that a detected burst of impulse noise actually corresponds to data corruption caused by a corresponding burst at the other end of the line. However, since impulse noise bursts are relatively rare events, it does not matter much if retransmission takes place even if data at the other end was not actually corrupted.

Further, the technique may be made adaptive, so as to make fewer unnecessary retransmissions while still retransmitting all or virtually all data units for which it is needed. Indications for the need of retransmission sent from the receiving end, (or the lack thereof) may be correlated with properties of detected noise bursts (typically various measures of noise strength, but also spectral characteristics) to discriminate between noise bursts that correspond to data corrupting bursts at the other end and bursts which do not so correspond.

It may be difficult to discriminate between a noise burst originating from an event at the other end of the line and a noise burst originating from a weaker event at the same end of the line and having similar spectral properties. However with DSL, impulse noise almost always originates at the customer premises end and extremely seldom at the Central Office end, so this is not a problem.

In a method according to the invention then, a first communications equipment transmits data to a second equipment over a transmission line, and also buffers the transmitted data so as to enable later retransmission. If a first burst of impulse noise is detected by the first equipment at its end of the line, it retransmits to the second equipment one or more data units in response, at least one of the retransmitted units having been sent at such a time that it may have coincided with a corresponding second noise burst at the other end of the line which originated from the same electrical event.

In a simple aspect, all the buffered data units are retransmitted. In a more elaborate aspect, only some of the buffered data units are retransmitted, such as those residing at predefined positions in the buffer, or data units whose reception at the other end according to a calculation may have coincided with the second burst.

In a further simple aspect, retransmission of data units that may have been corrupted is initiated every time a noise burst is detected.

In more elaborate aspects, properties of the noise burst may be examined to decide whether to retransmit or not. The decision to retransmit may be based on a criterion. The criterion may be based on properties of the detected noise burst, such as various measures of the burst strength as well as its spectral characteristics. The criterion may also be based on the line attenuation.

Further, the criterion may also be based on correlation between burst properties and corresponding retransmission indications (or the lack thereof) from the second equipment.

The methods according to the invention may be applied to the transmission from a DSLAM to a CPE and/or the transmission from a CPE to a DSLAM.

An aspect of the invention may be implemented as a first XTU having an impulse noise detector arranged to initiate retransmission of one or more data units from the first XTU to a second XTU at the other end of the line in response to the detection of a burst of impulse noise at the end of the line connected to the first XTU.

It is an object of the invention to enable higher data rates and/or smaller buffer sizes and an advantage that this can be achieved.

A further object is to keep the number of unnecessary retransmissions low, and still an object is to minimize the number of data units for which retransmission was needed but not made. It is an advantage that unnecessary retransmissions may be kept low while minimizing the number of data units for which retransmission was needed but not made.

DETAILED DESCRIPTION

Figure 1:
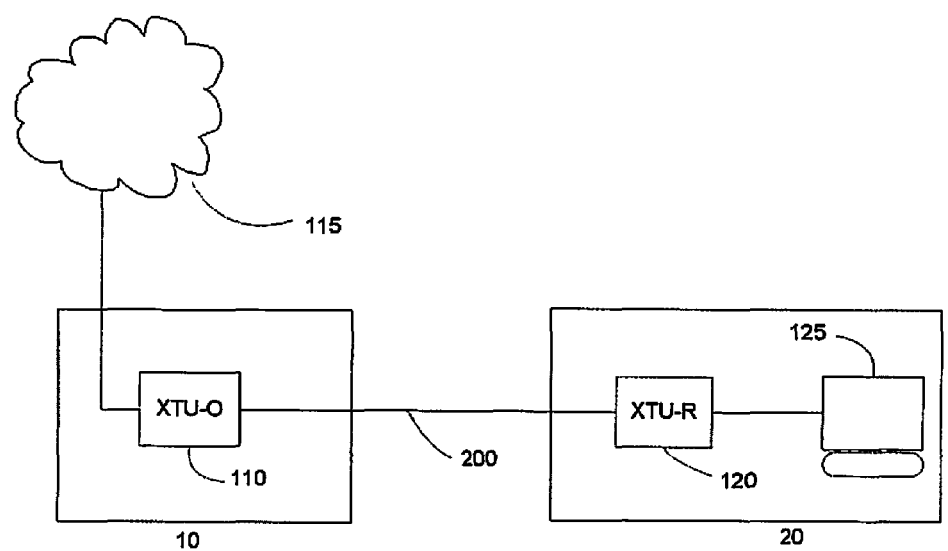
FIG. 1 shows a block schematic of an arrangement for data communication over a telecommunications transmission line.

FIG. 1 shows a typical arrangement for data communication over a telecommunications transmission line. The transmission line 200 connects a central office 10 with customer premises 20. At the central office, the line terminates at an XTU-O 110 (XDSL Terminal Unit at the Operator side) such as a DSLAM (DSL access multiplexer), and at the customer side the line terminates at an XTU-R 120 (XDSL Terminal Unit at the Remote side), such as a DSL modem (often called CPE, Customer Premises Equipment). Filter arrangements (not shown) are usually provided to separate communication on POTS frequencies from communication on DSL frequencies. The communication over the line between the XTU-O and the XTU-R utilizes a suitable DSL standard, such as ADSL, VDSL or VDSL2. The XTU-R is connected to user equipment such as a personal computer 125. The XTU-O has a data connection to the internet 115, and thus the XTUs provide the personal computer with internet connectivity via the transmission line.

As with any data communication, the reception of data at an XTU may be corrupted by noise. Various coding schemes for detecting and correcting such data corruption exist, for example Trellis coding or Reed-Solomon coding with interleaving. This is usually sufficient for handling background noise. Impulse noise however, presents a more difficult problem.

Since impulse noise bursts are strong but relatively rare events, error-protecting codes are not very efficient in terms of use of memory and bandwidth. Coding and interleave must be configured for worst case noise impulses, and so most of the time, the bandwidth and memory resources allocated for noise protection aren't really needed.

A different and more efficient way of protecting against impulse noise is by way of retransmission. When the reception of a data unit is corrupted and cannot be recovered by means of existing error codes, the receiving equipment sends an indication to the transmitting equipment that the data unit needs to be sent again. In this way extra bandwidth for impulse noise protection is used only when actually needed. Error codes can be kept rather small, as they need only protect against errors caused by background noise.

Figure 2:
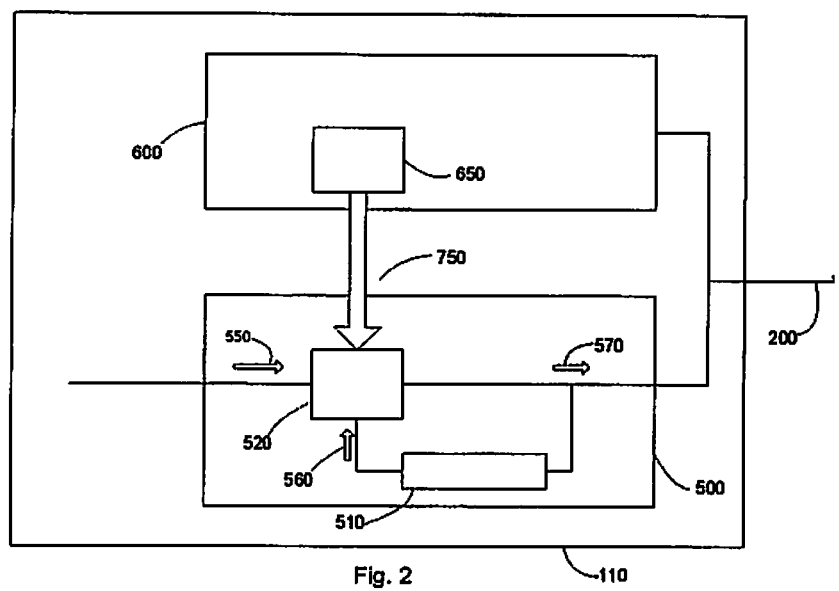
FIG. 2 shows a block schematic of a transmission system utilizing retransmission.

FIG. 2 shows a general structure of a system utilizing retransmission.

Data to be transmitted 550 is fed to a retransmission multiplexer 520 in a transmitting unit 500. In the absence of any need for retransmission, the data is fed directly to an outgoing data stream 570 and transmitted on the line 200. The transmitted data is also stored in a retransmission buffer 510 (sometimes called a retransmission queue). A receiving unit 600 receives data from the line. Most of this data is payload data (not shown) which is transmitted further, e.g. to the internet. A part of the data is control signaling, which is received by a control signaling handler 650. A control signal may for example be an indication from the equipment at the other end of the line that a particular data unit was not received correctly and needs to be retransmitted. Such an indication may be an explicit request to retransmit a particular data unit, or it may be an implicit request, for example if data units are acknowledged sequentially and a data unit identity is missing from the sequence of acknowledgements.

When the control signaling handler 650 receives an indication that a data unit needs to be retransmitted, it orders the retransmission multiplexer to retrieve that data unit 560 from the retransmission buffer 510 instead of retrieving a new data unit from the input stream 550. The data unit is inserted into the outgoing data stream 570 and thus retransmitted on the line.

Data remains in the retransmission buffer until it has been acknowledged, or until a delay limit has been exceeded, in which case it is discarded.

It follows from the structure of this system that the buffer 510 needs to be at least large enough to accommodate sent data for a time equal to the time from that a data unit is placed in the buffer 510 until an indication is received by the handler 650 about whether the data was received correctly at the other end of the line or not. This time is denoted the round trip time, RTT.

Thus for a constant RTT, a high data rate requires a large buffer or conversely, a small buffer can limit the attainable data rate. Now, with for example VDSL2, very high data rates can be attained over lines which are short (e.g. a few hundred meters). On the other hand, existing hardware designs often have limited memory available for buffers. This means that the attainable data rate in these cases may be limited by the memory of the XTUs rather than by the physical characteristics of the transmission line.

Figure 3:
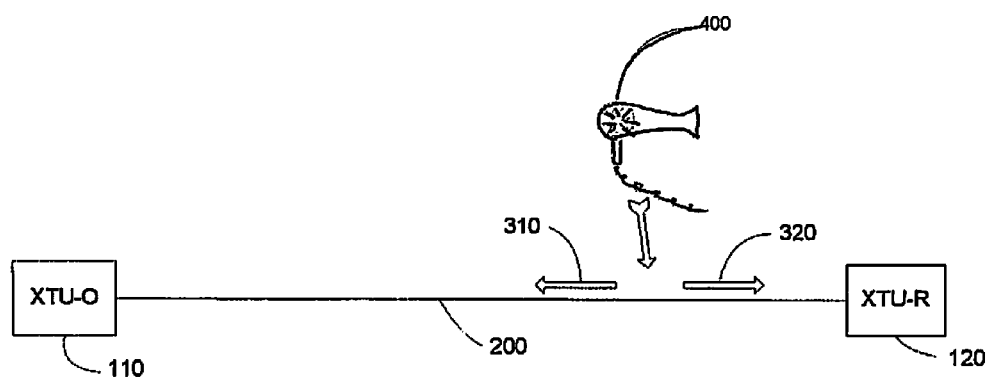
FIG. 3 shows a block schematic of impulse noise entering a transmission system.

FIG. 3 shows a drawing of impulse noise entering a transmission line.

Impulse noise is caused by various electrical events and may in principle enter the transmission line anywhere along its length. However, the source is almost always electrical equipment at the customer premises and the impulse noise enters the line at or near the customer end, i.e. the end connected to the XTU-R. (The position along the line in the figure is not drawn to scale).

In FIG. 3, the brushes and commutator of the electric motor of a hair dryer 400 create sparks as it rotates. For each spark, impulse noise is induced into the transmission line. A first noise wave 310 travels along the line 200 in the direction of the XTU-O 110 and arrives there as a first burst of impulse noise. A second noise wave 320 travels in the direction of the XTU-R 120 and arrives there as a second burst of impulse noise.

If the line is very long, the first noise burst may be weak while the second burst is strong. Particularly for short lines however, both bursts will be quite strong and at least clearly detectable.

The time for a noise burst to travel the length of the transmission line is very short compared to the time needed for receiving and processing signals in the XTU equipment. So, for practical purposes, the first and second noise burst can be regarded as arriving at the respective ends of the line at virtually the same time.

In the prior art, retransmission is always initiated by the equipment at the receiving end, since it is that equipment which is able to detect that reception of data was corrupted.

However, when impulse noise is present, this is highly likely to cause data corruption, and impulse noise may be detected at any end of the line. Hence, monitoring the line at the transmitting end for bursts of impulse noise can provide a way to initiate retransmission earlier than in the prior art, thus reducing the needed buffer size or increasing the attainable data rate.

For short lines in particular, the high data rates allowed by the line makes the buffer size requirements of prior art retransmission schemes a problem, while impulse noise bursts on these lines are very clearly detectable at both ends of the line. This provides a good match.

Such a retransmission scheme will be further described below.

Figure 4:
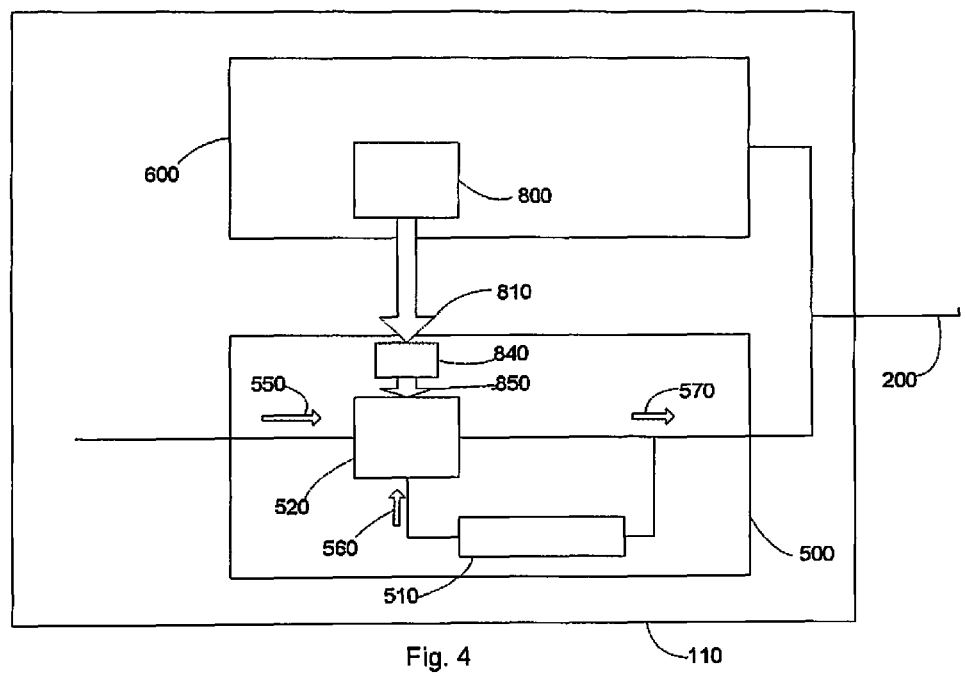
FIG. 4 shows a block schematic of an improved system utilizing retransmission.

FIG. 4 shows an inventive modification of the system of FIG. 2. In the absence of noise or data corruption, it does not retransmit and functions similar to the system of FIG. 2.

When an electrical event such as a spark in a hair dryer generates noise, a first burst of impulse noise on the line is detected by the impulse noise detector 800 in the receiver 600, and the detector 200 notifies the data unit selector 840. The selector selects data units for which the reception at the other end of the line for at least one of them may have coincided with a second burst of impulse noise originating from the same electrical event that caused the first burst, and thus might have had their reception at the second end corrupted by the second burst. The selector then orders the multiplexer 520 to retransmit those data units, similar to the functioning of the system in FIG. 2.

The selection of data units may in a simple aspect always be all the data units currently buffered. This is easy to implement and is sure to include any buffered data units which were hit by the noise at the other end of the line. In more elaborate aspects, a calculation may be made to more precisely determine which data units were sent at such a time that they may have been hit by the noise burst at the other end of the line. The calculation may be made in advance, so that the selection of data units during operation is very simple and can be e.g. that the data units to be retransmitted are always those residing at particular positions at the end of the buffer.

The selection unit is not always needed, as e.g. in the case of retransmission of all the data in the buffer, or the data in predefined positions in the buffer no explicit selection decision needs to be taken.

Figure 5:
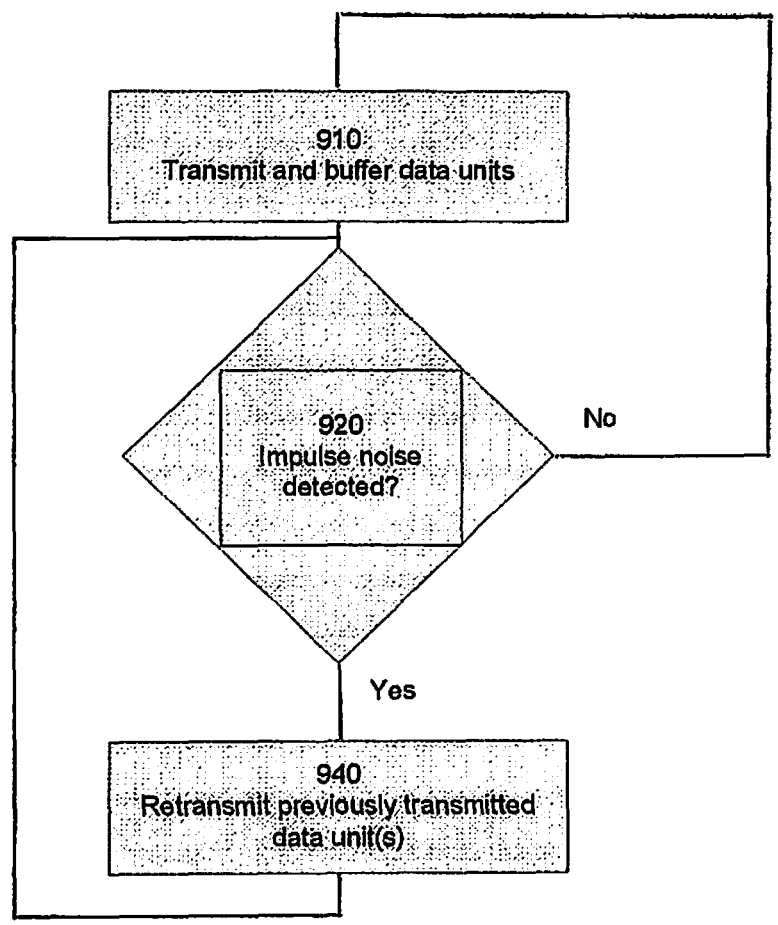
FIG. 5 shows a flow chart of a method of an improved retransmission scheme.

FIG. 5 shows a flowchart of a method according to which the device of FIG. 4 may operate.

In a step 910, data units are buffered and transmitted. In a step 920, it is checked if impulse noise was present. If not, transmission and buffering continues, step 910. If noise was present, data units are retransmitted, step 940. The process then repeats from step 920.

The functioning of an implementation in a VDSL2 system is described below, with particular reference to FIG. 6.

VDSL 2 is described in ITU-T recommendation G.993.2. The invention is of course not limited to VDSL2 or xDSL, but can be used in any system where retransmission is supported.

In VDSL2, data units called DTUs are packed into DMT symbols, which are transmitted sequentially on the line using Discrete Multitone modulation. Each of the used tones are QAM-modulated and transmitted for the symbol duration of 250 us. When received, the DMT symbol is demodulated by performing a Fourier transform of the received signal. From the so generated Fourier spectrum, it is possible to determine if the reception of the tone was subject to impulse noise. Methods for such determination are described in e.g. U.S. Pat. No. 7,443,916 B2.

Current implementations of VDSL2 comprise such detection functionality, but it is only used to generate statistics of impulse noise, and not presented on a per-DMT symbol basis or in any way used for initiating retransmission.

Figure 6:
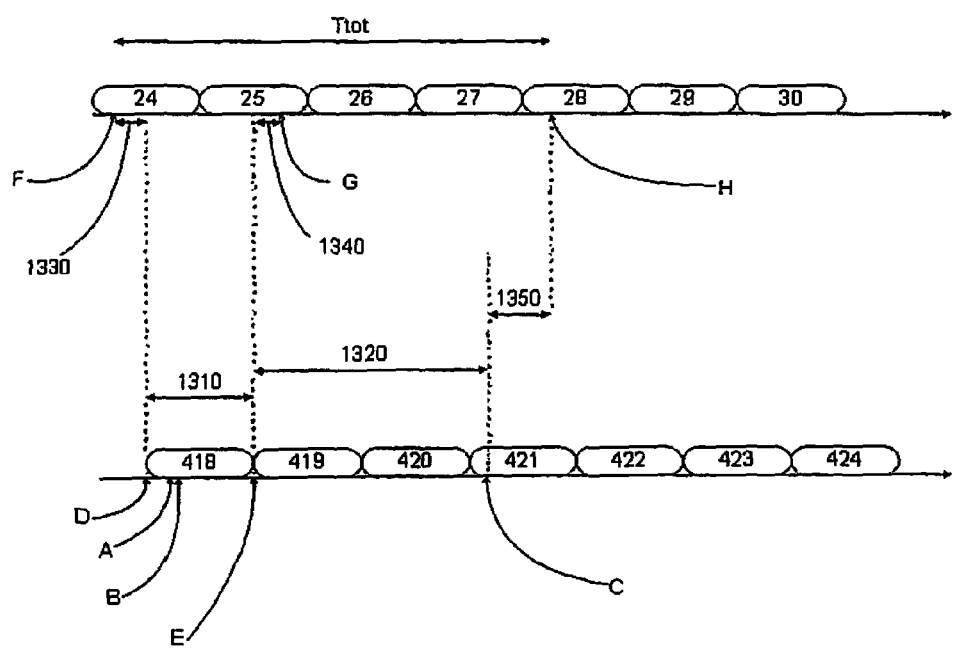
FIG. 6 shows a timing diagram for sent DMT symbols, received DMT symbols and a burst of impulse noise, in a VDSL2 system.
Figure 7:
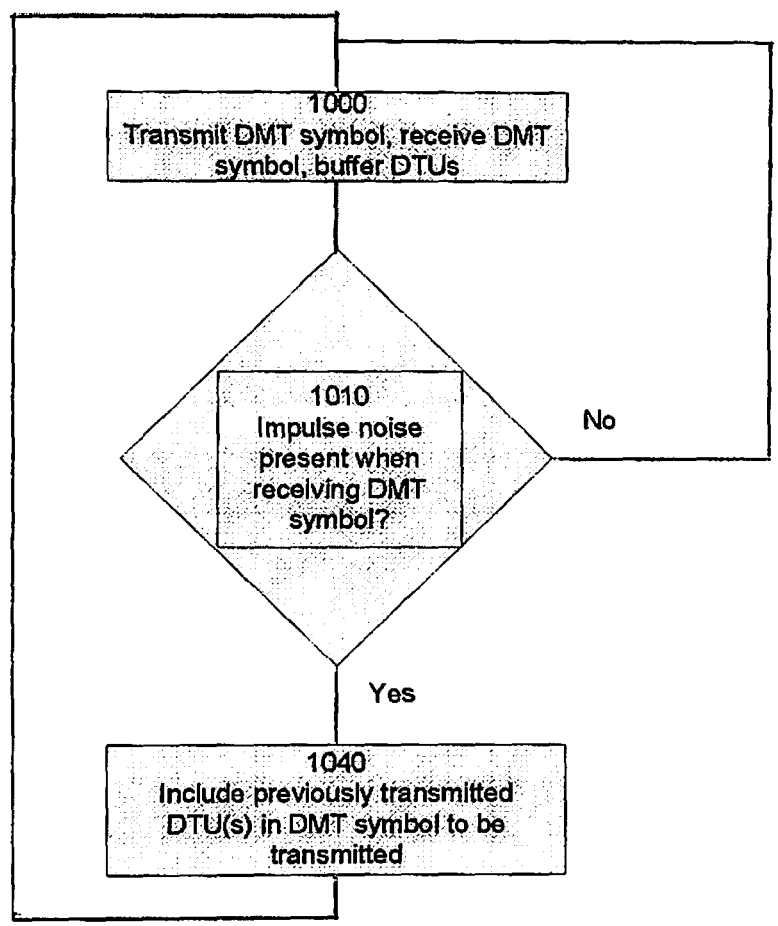
FIG. 7 shows a flow chart of a method of an improved VDSL2 retransmission scheme.

FIG. 6 shows a timeline of a sequence of VDSL2 DMT symbols numbered 24-30 being transmitted by a DSLAM to a CPE (step 1000 of FIG. 7), and a corresponding timeline of DMT symbols numbered 418-424 being received by the DSLAM from the CPE.

At the point A in time, a brief burst of impulse noise (320 of FIG. 3) affects the reception of data at the CPE. The burst was caused by an electrical event near the CPE end of the line. A very brief moment later, at time B, a corresponding burst of impulse noise (310 of FIG. 3) generated by the same event arrives at the DSLAM during the reception of DMT symbol no 418. At the moment E, reception of the DMT symbol is complete. The received data is further processed to detect if impulse noise was present, and at the moment C, information is available that a burst of impulse noise was present during the reception of DMT symbol 418 (step 1010 of FIG. 7).

It is normally difficult or impossible to detect exactly at what point in time during the reception of the DMT symbol that the noise burst occurred (and longer noise bursts may actually last for more that the duration of an entire DMT symbol), so the information which can be made available is typically that a burst was present at the DSLAM end of the line between the times D and E.

As can be seen in the figure, DMT symbols 24 and 25 were transmitted in this interval, and hence their reception at the CPE end of the line may have coincided with and been corrupted by a corresponding noise burst there (320 of FIG. 3) which was generated by the same electrical event. To account for inaccuracies in timing, as well as for the small propagation delay on the line, a suitable margin 1330 may be added to the time interval. This margin should be at least twice the propagation delay, to account for the propagation delay of the noise burst and also the propagation delay of the DMT symbol transmitted from the DSLAM to the CPE. However, since propagation delay is normally very small, it will usually be sufficient only to use a fixed margin independent of line length. A margin 1340 at the later end of the interval may also be used to guard against inaccuracies, etc.

From the times D and E and the margins 1330 and 1340, it then follows that data units contained in the DMT symbols wholly or partly transmitted in the interval from F to G may be in need of retransmission (in this case the data in DMT symbols 24 and 25). The selecting unit (840 of FIG. 4) selects those data units for retransmission. Preparations for transmission (step 1040 of FIG. 7), such as assembling the data units to be retransmitted into a DMT symbol may take a further time 1350, so that retransmission may take place in the next subsequent DMT symbols after time H, i.e. in this case number 29 and 30.

From the figure, it follows that it may be needed to buffer data contained in DMT symbols sent wholly or partly during a time interval of length Ttot (Ttot is the sum of intervals 1330, 1310, 1320 and 1350).

The length of Tot expressed in DMT symbols can be calculated as Ttot divided by the DMT symbol duration. To account for the worst case where symbols fall partly within the interval, the value is rounded up to the nearest whole number plus 1. (For the time intervals given in the figure, this means a worst case of 5 DMT symbols.)

This value is then multiplied by the amount of data per DMT symbol, to get the needed buffer size. This will typically be half or less of the buffer size needed for a conventional retransmission scheme where retransmission is initiated from the receiving end.

A simple and efficient variant is to use a sequential retransmission buffer where data is entered at the first position and successively moves to the last position where it is discarded. (This will typically be implemented as a fixed memory area with moving pointers to first, last and intermediate buffer positions, so that data is entered into memory once and remains in place until it is overwritten by newly entered data.) The data to be retransmitted can then be selected as the N last data positions in the buffer, so as to make selection of data to be retransmitted extremely simple, yet precise.

In the example embodiment above, if the margins 1330 and 1340 each are less than ½ DMT symbol duration, and since the interval 1310 is equal to one DMT symbol duration, at most 3 DMT symbols can fall into the interval from F to G and thus may have been hit by noise and need retransmission.

This means that 3 DMT symbols worth of data units have to be retransmitted (the amount of data per DMT symbol depends on the data rate of the line) when impulse noise is detected. If the total buffer size is selected as described above, then the data to be retransmitted is the last 3 DMT symbols worth of data in the buffer. (N=3)

When data is retransmitted, it may be entered again at the beginning of the buffer, so as to enable a further retransmission if the first retransmission was hit by impulse noise too.

If impulse noise is detected in several successively received DMT symbols at the DSLAM, then the 3 DMT symbols worth of data to be retransmitted for each of the detections will overlap with 2 of the 3 DMT symbols worth of data to be retransmitted from the previous detection, and the overlapping data will not yet have been retransmitted. In this case it is of course necessary only to retransmit the overlapping data once.

As an alternative to the ways given above of calculating the buffer size and the amount and position in the buffer of data to retransmit, suitable values for these may also be found through routine experimentation, or even by rough estimate with a reasonable safety margin. E.g. a sequential buffer may be made large enough to hold 12 DMT symbols worth of data, and the last 5 DMT symbols worth of data may be retransmitted upon impulse noise detection.

In the aspects given above at least one data unit is retransmitted which was previously sent at such a time that its reception at the second end may have coincided with a second burst of impulse noise there, the burst originating from the same electrical event as the first noise burst. As shown in the examples, this will typically not be calculated precisely, but suitable margins will be used to ensure that at least those data units which may have been hit are retransmitted.

In the examples, the methods have been described as implementing retransmission from the DSLAM to the CPE. However, the same methods may of course be analogously applied also to transmission in the opposite direction, with the difference that with respect to that direction of transmission, the impulse noise sources will be near the transmitting end rather than the receiving end, which affects the calculations of time margins and the effect of line attenuation. The margin 1330 may be very small, as the propagation time need not be taken into account. The line attenuation (see below) need also not be taken into account, as the sent signal and the second noise burst travel in the same direction along the line and their strength at the other end of the line is affected in the same way by the line attenuation.

Selective Retransmission

It may of course be the case that when a first burst of impulse noise is detected at the DSLAM end, the corresponding second burst at the CPE end was not strong enough to cause any data corruption. In this case, retransmission will take place even though it is actually not needed. This does not normally cause any harm, and as impulse noise bursts are relatively rare events, the wasted bandwidth is usually not a problem.

However, in order to minimize such unnecessary retransmissions, the decision to retransmit may be made more elaborate. A criterion depending on properties of the detected noise burst may be defined, and retransmission made only if the criterion is fulfilled.

For example, a measure of the strength of the noise burst may be calculated, and retransmission made only if the strength exceeds a certain threshold.

For each DMT tone, the error in the constellation diagram between the transmitted QAM constellation point and the actual measured signal may be calculated. The square of such an error sample can be taken as a measure of noise power (in relation to signal power) at that particular tone. The average power of a predefined number of tones having the greatest noise power may be taken as a strength measure of the burst of impulse noise.

The attenuation of the line may be measured, and used to calculate a threshold. The power of a noise burst originating from the CPE end of the line is decreased by the line attenuation when it reaches the DSLAM end, and hence the noise burst at the CPE end is stronger than the burst at the DSLAM end by the line attenuation factor. Likewise, the signal transmitted from the DSLAM is attenuated and is weaker by the same factor when it reaches the CPE end. Therefore, the relationship between the signal and the impulse noise power at the CPE end will be worse by a factor of line attenuation squared as compared to the relationship at the DSLAM end.

A general maximum acceptable noise level may be defined, and then for each line a threshold defined as that level divided by the line attenuation squared.

In a more elaborate aspect, a general limit for an acceptable quotient between signal power and noise power may be predefined and then for each particular line and each tone a threshold set as that general limit increased by a factor of the square of line attenuation for that tone. Then, when a DMT symbol is received, for each tone in the DSLAM transmit band the quotient between transmitted power and noise power may be estimated and retransmission initiated when for a predefined number of tones the threshold is not reached.

It is noted that the FFT of the received signal can provide information for both receive and transmit bands, and hence noise levels can be measured for tones in the transmit bands. It may in some cases be desirable to base the retransmission decision only on the conditions in the transmit bands of the DSLAM, which are the receive bands of the CPE and hence the bands where noise may corrupt data reception by the CPE.

Typically, adjacent parts of two successive DMT symbols will be transmitted during the reception of a DMT symbol, so the expected points in the constellation diagram for the transmit bands will be intermediate points between the predefined points of the QAM scheme.

In order to estimate the noise power in relation to signal power in the transmit bands, it may also be necessary to account for the influence of the hybrid.

Figure 8:
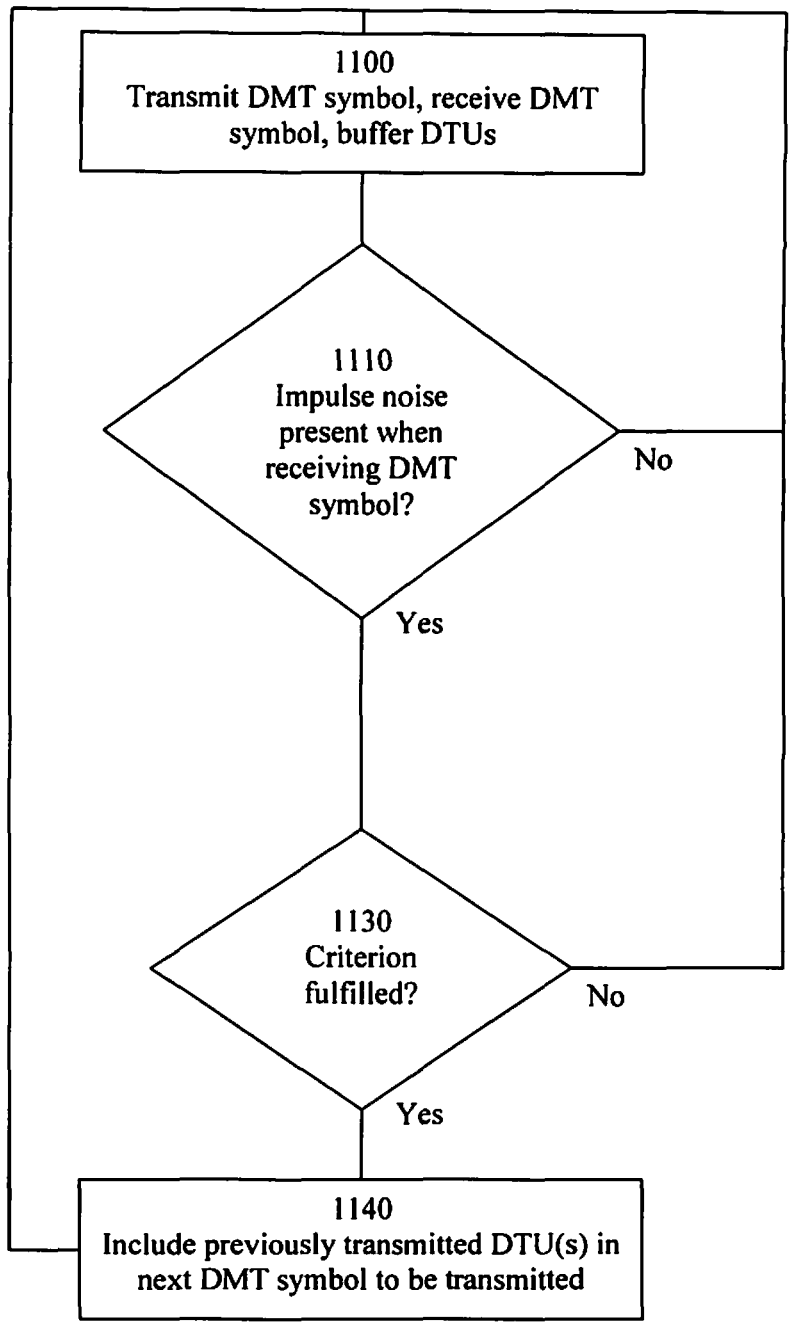
FIG. 8 shows a flow chart of a method of a further improved VDSL2 retransmission scheme.
Figure 9:
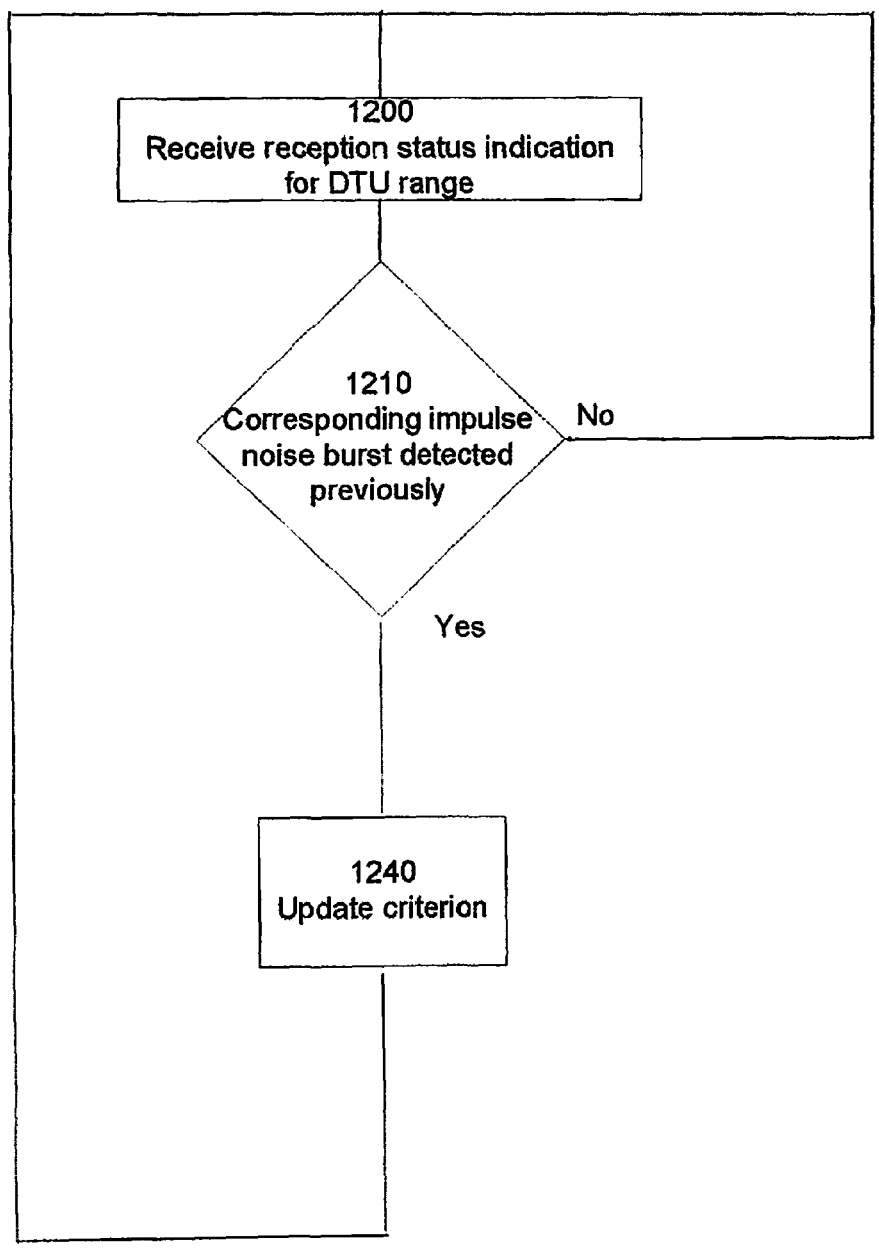
FIG. 9 shows a flow chart of a method for updating a retransmission criterion in a further improved VDSL2 retransmission scheme.

An application of the use of a criterion to a VDSL2 implementation is shown in FIG. 8. Similar to step 1000 of FIG. 7, in a step 1100, DMT symbols are transmitted and received and DTUs of the transmitted DMT symbols are buffered. In a step 1110 it is checked if impulse noise was present. If not, transmission etc continues from step 1100. However if noise was detected, it is checked if the criterion is fulfilled, step 1130. If not, transmission, etc continues from step 1100. If it was fulfilled, previously transmitted DTU(s) are included for transmission in the next DMT symbol, step 1140 (similar to step 1040 of FIG. 7). Transmission, etc then continues from step 1100.

In another aspect, the setting of threshold levels may be made adaptive. The prior art VDSL2 physical layer retransmission technology provides for acknowledgements of received DTUs (data units), and by not acknowledging a particular DTU, the receiving equipment requests the sending equipment to retransmit that DTU (retransmission indication). With the present invention, retransmission will already have been initiated when the indication arrives, but it can nevertheless be useful, as the presence or absence of a retransmission indication provides an indication whether retransmission was actually needed or not.

Hence, if some strength measure for the noise burst is used, and a threshold for retransmission is used such that retransmission takes place if the strength measure exceeds the threshold, then that threshold may be adjusted based on received retransmission indications. Noise burst strength intervals may be defined, and for each interval statistics may be kept as to how often noise bursts having a strength in that interval were followed by a corresponding retransmission indication. The threshold may be continuously adjusted so that for the intervals below the threshold the number of retransmission indications is zero or insignificant. At startup, the threshold may be set to a very low value, and then successively increased as statistics accumulate. If retransmission indications for intervals below the threshold are received, the threshold may be immediately lowered. In this way, the attenuation of the line will be taken into account automatically, and it is possible to set the threshold with some precision without explicit knowledge of the line attenuation.

In an even more advanced aspect, noise bursts may be classified according to spectral characteristics (i.e. the noise strength relationship between the tones), and statistics kept per such class. Retransmission decisions may then be based on the class for the detected noise burst and on statistics for that class. In a similar way, multidimensional classification may be made, using both spectral characteristics and strength.

FIG. 8 shows a method for updating a criterion (e.g. changing a threshold value) as a result of receiving a reception status indication for a data unit (e.g. a retransmission indication or the lack thereof).

In a step 1200 a reception status indication is received for a DTU range. The indication is typically information that certain DTUs are acknowledged (ie received correctly), and/or that certain DTUs were not received correctly (normally deduced from the lack of an acknowledgement).

In a step 1210, the detection unit 800 of FIG. 4 checks if previously a first impulse noise burst was detected which may have corresponded to a second impulse noise burst at the other end of the line coincident with the reception of the data for which reception status indication was received, so that the second burst may have affected the reception of the data.

If such a burst was detected, the criterion is updated accordingly by the detection unit 800, step 1240. E.g. the statistics for the strength interval to which the first burst belonged are updated to show the number of bursts for which data was corrupted and not corrupted respectively. If a data unit was corrupted, and if the retransmission threshold was set higher than this strength interval, then the threshold may be immediately lowered to include also this interval, as the information about the corrupted data unit indicates that bursts of this strength may indeed cause data corruption, contrary to the previous setting of the threshold. On the other hand, if there was no data corruption for this burst, and has not been for a very large number of bursts in the strength interval, and the threshold is currently set lower than the interval, it may be raised, to reflect the fact that bursts in this strength interval are highly unlikely to cause data corruption.

The invention claimed is:

1. A method, in a first communications equipment, for handling transmission errors on a telecommunications transmission line, the first communications equipment being adapted for connection to a first end of the telecommunications transmission line and for communication via the telecommunications transmission line with a second communications equipment connected to a second end of the telecommunications transmission line, the method comprising:
the first communications equipment buffering one or more data units which are to be transmitted so as to enable later retransmission;
the first communications equipment transmitting the one or more data units to the second communications equipment;
the first communications equipment detecting a first burst of impulse noise at the first end of the line;
the first communications equipment, in response to the detection:
selecting one or more of the buffered data units as selected data units;
retransmitting the selected data units to the second communications equipment;
wherein the selecting comprises selecting buffered data units such that at least one of the selected data units corresponds to a data unit previously transmitted at such a time that its reception by the second communications equipment coincides with a second burst of impulse noise at the second end of the line, the second burst of impulse noise originating from a same electrical event as the first burst of impulse noise.

2. The method of claim 1, wherein the selecting comprises selecting all buffered data units.

3. The method of claim 1, wherein the selecting comprises selecting a subset of the buffered data units.

4. The method of claim 3, wherein the selecting comprises selecting data units residing in predefined buffer positions.

5. The method of claim 1, further comprising determining whether to perform the retransmitting based on one or more properties of the first burst of impulse noise such that the retransmitting takes place only if a criterion depending on one or more properties of the first burst of impulse noise is fulfilled.

6. The method of claim 5, wherein the criterion is based on a measure of the strength of the first burst of impulse noise.

7. The method of claim 6, wherein the criterion is further based on an estimate of the attenuation of the transmission line.

8. The method of claim 5, wherein the criterion is based on a correlation between one or more properties of previous noise bursts detected at the first end of the line and corresponding retransmission indications from the second communications equipment.

9. The method of claim 1, wherein the first and second communications equipment are x Digital Subscriber Line (xDSL) equipment.

10. The method of claim 9, wherein the first communications equipment is an xDSL Digital Subscriber Line Access Multiplexer (xDSL DSLAM) and the second communications equipment is an xDSL Customer-Provided Equipment (xDSL CPE).

11. The method of claim 9, wherein the first communications equipment is an xDSL Customer-Provided Equipment (xDSL CPE) and the second communications equipment is an xDSL Digital Subscriber Line Access Multiplexer (xDSL DSLAM).

12. The method of claim 1, wherein the time is in a time interval during which a Discrete Multi-Tone (DMT) symbol was received by the first communications equipment and, during which reception, the first burst of impulse noise was present.

13. A first x Digital Subscriber Line (xDSL) Terminal Unit (XTU) adapted to be connected to a first end of a telecommunications transmission line and adapted to communicate via the telecommunications transmission line with a second XTU connected to a second end of the telecommunications transmission line, the first XTU comprising:
an impulse noise detector operative to initiate retransmission of one or more data units from the first XTU to the second XTU in response to detection of a first burst of impulse noise at the first end of the line;
a selector operationally coupled to the detector and configured to:
in response to the detector initiating retransmission, select one or more buffered data units as selected data units so that at least one of the selected data units corresponds to a data unit previously transmitted at such a time that its reception by the second XTU coincides with a second burst of impulse noise at the second end of the line, wherein the second burst of impulse noise originates from a same electrical event as the first burst of impulse noise;
a retransmission multiplexor operationally coupled to the detector and the selector and configured to:
buffer one or more data units which are to be transmitted so as to enable later retransmission; and
retransmit the selected data units to the second XTU.

14. The first XTU of claim 13, wherein the time is in a time interval during which a Discrete Multi-Tone (DMT) symbol was received by the first XTU and, during which reception, the first burst of impulse noise was present.

15. The first XTU of claim 13, wherein the detector is further configured to initiate retransmission responsive to determining that a certain criterion associated with a property of the first burst of impulse noise is fulfilled.

16. The first XTU of claim 15, wherein the certain criterion is based on a correlation between a property of a previous burst of impulse noise detected at the first end of the line by the first XTU and a corresponding retransmission indication received by the first XTU from the second XTU.

* * * * *

UNITED STATES PATENT AND TRADEMARK OFFICE
CERTIFICATE OF CORRECTION

PATENT NO. : 9,166,743 B2  
APPLICATION NO. : 13/976665  
DATED : October 20, 2015  
INVENTOR(S) : Eriksson et al.

Page 1 of 1

It is certified that error appears in the above-identified patent and that said Letters Patent is hereby corrected as shown below:

In the specification

In Column 1, Line 52, delete "Processing" and insert -- Processing. --, therefor.

In Column 6, Line 48, delete "detector 200" and insert -- detector 800 --, therefor.

In Column 11, Line 7, delete "In a step 1200" and insert -- In a step 1200, --, therefor.

Signed and Sealed this
Twenty-fourth Day of May, 2016

Michelle K. Lee
*Director of the United States Patent and Trademark Office*